Aug. 4, 1936.  J. E. LINDEMAN  2,049,709

SHOCK ABSORBER

Filed March 7, 1935  2 Sheets-Sheet 1

Inventor
James E. Lindeman
By Henry Fuchs
Atty.

Aug. 4, 1936.  J. E. LINDEMAN  2,049,709
SHOCK ABSORBER
Filed March 7, 1935  2 Sheets-Sheet 2
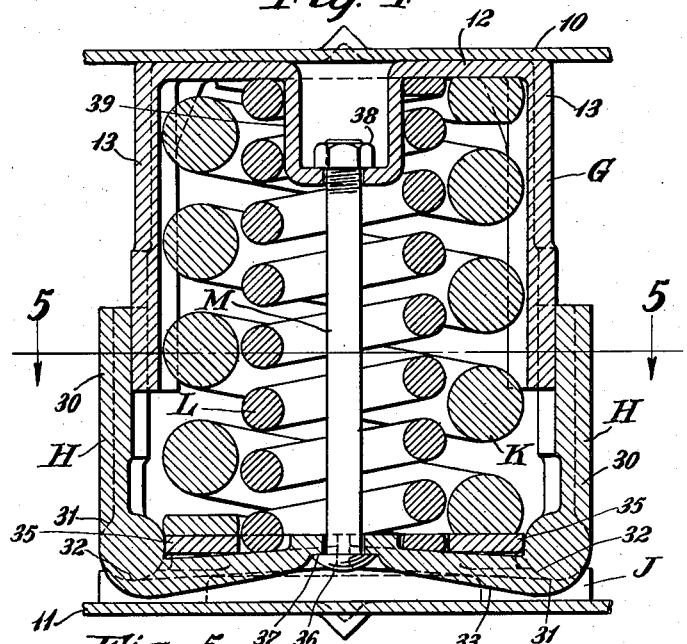
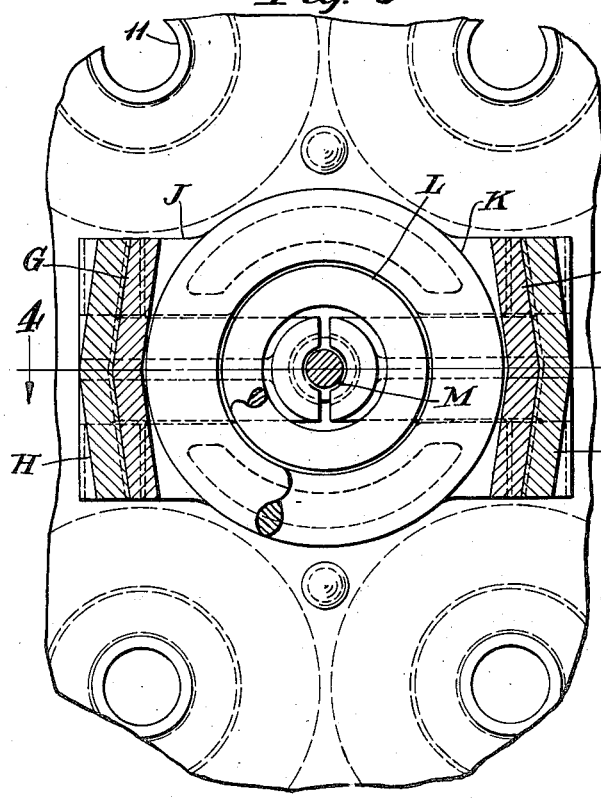
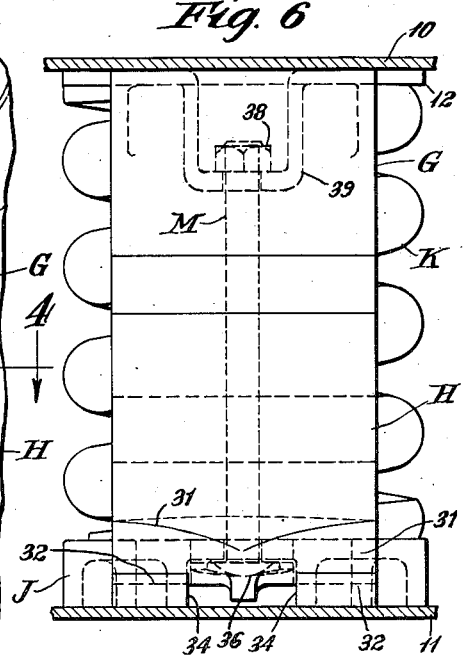
Inventor
James E. Lindeman
By Henry Fuchs Atty.

Patented Aug. 4, 1936

2,049,709

UNITED STATES PATENT OFFICE 2,049,709

SHOCK ABSORBER

James E. Lindeman, Evanston, Ill., assignor to W. H. Miner, Inc., Chicago, Ill., a corporation of Delaware Application March 7, 1935, Serial No. 9,727

6 Claims. (Cl. 267—9)

This invention relates to improvements in shock absorbers, especially adapted for use as snubbing devices in connection with springs of railway car trucks.

One object of the invention is to provide a shock absorber of simple design especially adapted for use as a snubber in connection with truck springs of railway cars and replacing one of the units of a cluster of coil springs of such car trucks.

Another object of the invention is to provide a shock absorber of the character described in the preceding paragraph wherein spring resisted friction means is employed to give high shock absorbing capacity and the parts of the device are so proportioned and designed that springs of relatively large diameter and high capacity may be accommodated within the combined mechanism.

A more specific object of the invention is to provide a friction shock absorbing device including cooperating relatively movable friction elements and spring means opposing relative movement of the friction elements, the device being designed to replace the usual center spring unit of each cluster of coil springs employed in connection with a railway car truck, and the arrangement of friction means being such that springs of substantially the same size and capacity as the springs of the replaced unit may be embodied in the device.

Still another object of the invention is to provide a shock absorbing device of the character indicated comprising relatively movable friction elements and spring means opposing relative movement of the friction elements, wherein one of the friction elements is in the form of a shell and the cooperating elements are in the form of shoes engaging the exterior of the shell, and wherein the shell and shoes are cut away at opposite sides to clear the adjacent spring units of the spring cluster of a railway car truck, thereby permitting the use of coil springs of such a size in the shock absorbing device that they substantially fill the space usually occupied by the central unit of a spring cluster of a railway car truck member.

Other objects of the invention will more clearly appear from the description and claims hereinafter following.

Figure 1:
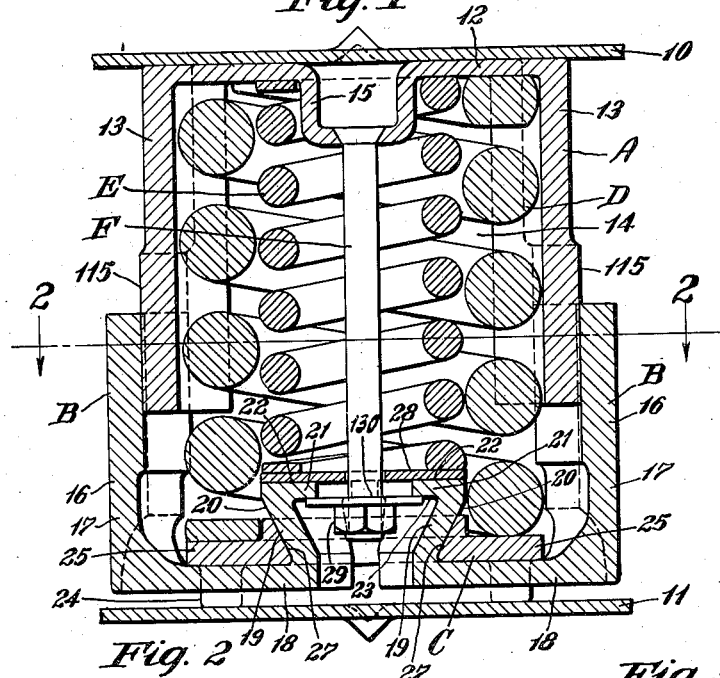
Figure 2:
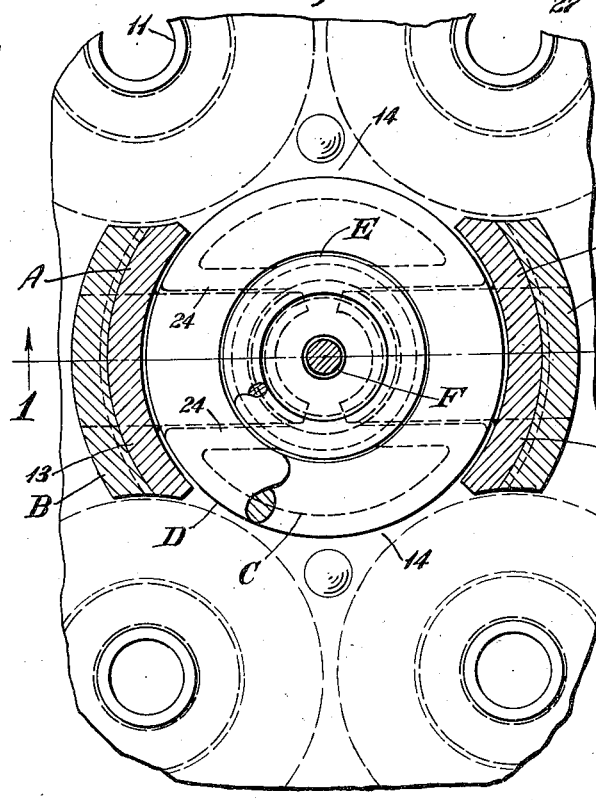
Figure 3:
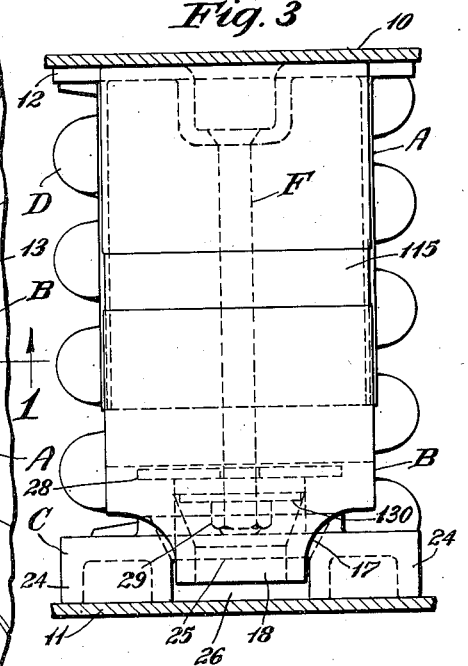

In the drawings forming a part of this specification, Figure 1 is a vertical sectional view through the upper and lower spring follower plates for a spring cluster employed in connection with a railway car truck, showing my improved device in connection therewith, the spring follower plates being broken away, the section through my improved device corresponding substantially to the line 1—1 of Figure 2. Figure 2 is a horizontal sectional view, on an enlarged scale, corresponding substantially to the line 2—2 of Figure 1. Figure 3 is a side elevational view looking from left to right in Figure 1, the spring follower plates being shown in section. Figures 4, 5, and 6 are views respectively similar to Figures 1, 2, and 3, illustrating another embodiment of the invention.

Referring first to the embodiment of the invention illustrated in Figures 1, 2, and 3, 10 and 11 indicate the upper and lower spring follower plates of a spring cluster employed in connection with the usual railway car truck. My improved device is shown interposed between the spring plates 10 and 11 and replaces the central unit of the spring cluster.

My improved shock absorber, as illustrated in Figures 1, 2, and 3, comprises broadly a friction member A; a pair of friction shoes B—B; a wedge C; springs D and E; and a retainer bolt F.

The friction member A comprises a top wall 12 and opposed side walls 13—13, which are spaced apart, the member A being in effect a friction shell which has the opposite side walls thereof cut away, as indicated at 14—14. The side walls of the friction member A are curved, as clearly shown in Figure 2, and are provided with exterior substantially cylindric friction surfaces 115—115, which are offset outwardly with respect to the main portions of the outer surfaces of the side walls 13—13, as shown most clearly in Figure 1. The offset arrangement of the friction surfaces prevents forming of a shoulder at the extreme limit of travel of the friction surfaces of the mechanism on each other. The top wall 12 of the friction member A is provided with a central, inwardly projecting hollow boss 15.

The friction shoes B—B, which are of like design, are arranged at opposite sides of the device and cooperate with the friction surfaces of the walls 13—13 of the friction member A. Each shoe comprises a vertical section 16 having a curved friction surface on the inner side thereof cooperating with the exterior curved surface 115 of the corresponding side wall 13 of the member A. The friction surfaces of the shoes are also inwardly offset with respect to the main portions of the inner surfaces of the vertical sections 16—16 of the friction shoes B—B for the same purpose as hereinbefore described in connection with the friction surfaces of the friction member A. At the lower end of the vertical section 16, the shoe B is reduced in width, as indicated at 17, and has an inwardly extending, horizontal section 18 at right angles to the section 16, forming a continuation of the section 17. The section 18 has an upstanding portion 19 at the inner end thereof, provided with a wedge face 20 on its outer side. At the top, the portion 19 is laterally inwardly extended, as indicated at 21, said portion 21 having a flat top face 22 and an inner shoulder 23.

The wedge C is in the form of a follower block having spaced feet 24—24 at opposite sides thereof. The feet 24—24 are connected by transverse sections 25—25 spaced above the base of the feet members, thereby providing openings 26—26 through which the sections 18—18 of the shoes B—B extend. Each transverse section 25 has a wedge face 27 on the inner side thereof cooperating with the wedge face 20 of the corresponding shoe. The wedge C rests directly on the lower spring plate 11 and serves as a follower for the outer coil spring D which is interposed between said wedge and the top wall 12 of the housing. The outer coil spring D is relatively heavier and of greater capacity than the inner coil spring E. The inner coil spring E is interposed between the top wall 12 of the housing and the friction shoes B—B, the bottom end of said spring E bearing on a disc 28 supported on the abutment faces 22—22 of the inward extensions 18—18 of the shoes B—B.

The retainer bolt F is anchored to the hollow boss 15 of the friction member A and has a nut 29 threaded on the lower end thereof, bearing on a disc 130 which is engaged beneath the shoulders 23—23 of the inward extensions of the shoes B—B. As will be evident, the retainer bolt serves to hold the parts of the mechanism assembled, and maintains the springs D and E under a predetermined initial compression.

As illustrated in Figure 2, my improved shock absorber is employed as a snubber in connection with a spring cluster of a railway car truck, being substituted for the usual central spring unit of a five unit cluster. It is pointed out that my invention is, however, not limited to this particular use as the shock absorber may be employed in connection with spring clusters composed of any number of spring units and two or more of the shock absorbers may be substituted for two or more of the spring units. Further, the improved device may be used to absorb shocks in any mechanism where the use of a shock absorbing device is found desirable. As will be clear upon reference to Figure 2, the improved shock absorber which is disposed centrally of the spring cluster is so arranged as to most advantageously make use of the space between the four outer spring units and is so designed that the springs which cooperate with the friction elements are of substantially the same size and capacity as the springs of the central unit of the cluster which has been replaced by the friction shock absorbing device.

In the operation of my improved shock absorber as illustrated in Figures 1, 2, and 3, upon movement of the truck and body bolsters of the card toward each other and compression of the spring cluster between the follower plates 10 and 11, the friction members A and the friction shoes B—B will be moved with respect to each other, lengthwise of the mechanism, thereby compressing the springs D and E. Inasmuch as the spring D bears on the wedge C and the top wall 12 of the friction member A, this spring is compressed without having any substantial effect on the frictional resistance between the friction members. The central spring E, which bears on the inward projections of the shoes B—B, forces the wedge faces of the latter against the wedge faces of the wedge member C, thereby pressing the sections 16—16 of the shoes B—B inwardly against the walls 13—13 of the friction member A and into tight frictional contact with the friction surfaces 115—115 of the latter. As the spring E is compressed during the relative approach of the follower plates 10 and 11 and the friction member A and shoes B—B, the pressure on the inward projections of the shoes is increased, thereby also increasing the wedging action and augmenting the frictional resistance between the shoes B—B and the friction member A. Upon reduction of the actuating force, due to separation of the spring followers 10 and 11, the relatively heavy spring D will force the friction shoes B—B and the friction member A apart, while the frictional resistance is being reduced through reduction of the wedging action between the shoes and the wedge block C by expansion of the spring E. As will be evident, the expansion of the spring E also assists in separating the shoes B—B and the friction member A. The springs D and E thus act to restore the parts of the shock absorber to the normal position shown in Figures 1 and 3.

During expansion and compression of my improved device, the frictional resistance provided thereby serves to retard the oscillations of the truck springs, thereby reducing the vibratory action of the springs and minimizing the shocks to which the car would otherwise be subjected, thereby protecting the lading against damage.

Referring next to the embodiment of the invention illustrated in Figures 4, 5, and 6, my improved device comprises a friction member G; a pair of friction shoes H—H in the form of rockers; a bearing block J; outer and inner coil springs K and L; and a retainer bolt M.

The improved device shown in Figures 4, 5, and 6 is employed as a snubber in connection with truck spring clusters in a manner similar to the device shown in Figures 1, 2, and 3, and is interposed between the spring follower plates 10 and 11, as shown in Figures 4 and 6, the device being substituted for the central spring unit of the spring cluster as shown in Figure 5.

The friction member G is of substantially the same design as the member A hereinbefore described with the exception that the walls 13—13 thereof are of V-shaped cross section, as shown in Figure 5.

The friction shoes H—H have vertical outer sections 30—30 of substantially V-shaped cross section having sliding frictional engagement with the exterior friction surfaces of the walls 13—13 of the friction member G. At the lower end of the section 30 of each shoe H are laterally extending trunnions 31—31 which have rocking engagement in bearing seats 32—32 on the block J. Extending inwardly at right angles to the section 30, each shoe H has an arm 33 on the inner end of which the bottom of the spring L is seated. The spring L thus tends to rock the shoes H—H inwardly and hold the friction surfaces thereof in tight frictional engagement with the friction surfaces of the member G.

The arms 33—33 of the shoes extend between spaced feet 34—34 and beneath connecting sections 35—35 with which the block J is provided. The relatively heavy outer coil spring K has its opposite ends bearing respectively on the inner side of the top wall of the friction member G and on the connecting sections 35—35 of the block J.

The retainer bolt M is headed at the lower end, as indicated at 36, said head having shouldered engagement with the inner ends of the arms 33—33 of the shoes H—H, as indicated at 37. The opposite ends of the retainer bolt M are provided with a nut 38, which has shouldered engagement with the boss 39 provided on the top wall of the friction member G. As will be evident, the retainer bolt holds the mechanism assembled and limits the relative separation of the parts thereof and also maintains the springs K and L under predetermined initial compression.

During compression of the shock absorbing device illustrated in Figures 4, 5, and 6, the friction members G and shoes H—H are pressed tightly against each other through the action of the spring L which presses downwardly on the inner ends of the arms 33—33 of the rockerlike shoes H—H. In providing the snubbing action, the operation of this device is substantially the same as the action of the device hereinbefore described in connection with Figures 1, 2, and 3.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a friction member having longitudinally disposed exterior friction surfaces; of friction shoes movable lengthwise of said member and having friction surfaces on their inner sides slidingly engaging the friction surfaces of said member; a support having wedge faces; inward extensions on said shoes having wedge faces thereon engaging the wedge faces of said support; and spring means reacting between said extensions of the shoes and the friction member for forcing the wedge faces of the shoes against the wedge faces of the support.

2. In a shock absorber, the combination with a friction member having longitudinally disposed exterior friction surfaces; of friction shoes movable lengthwise of said member and having friction surfaces on their inner sides slidingly engaging the friction surfaces of said member; a wedge block having interior wedge faces; inward extensions on the shoes having wedging engagement with the wedge faces of said block to move the shoes laterally inwardly toward each other; and spring means within said friction member opposing relative movement of the shoes and friction member, said spring means including an element reacting between said friction member and the extensions of the shoes to force the same into wedging engagement with the wedge faces of said block.

3. In a shock absorber, the combination with a friction member having longitudinally disposed exterior friction surfaces; of friction shoes movable lengthwise of said member and having friction surfaces on their inner sides slidingly engaging the friction surfaces of said member; a block having wedge faces thereon; inward extensions on said shoes in wedging engagement with the wedge faces of said block; a spring element within said friction member reacting between said block and friction member; and a second spring element within said friction member reacting between the same and the inward extensions of the shoes for forcing said extensions of the shoes into wedging engagement with the wedge faces of said block.

4. In a shock absorber for trucks of railway cars adapted to oppose relative movement of the truck and body bolsters, the combination with spring plates bearing respectively on the truck and body bolsters; of a friction member bearing on one of said spring plates, said friction member having longitudinally disposed exterior friction surfaces; a wedge block bearing on the other of said spring plates; friction shoes movable lengthwise of said friction member and having friction surfaces on the inner sides thereof engaging the exterior friction surfaces of said member; a spring within said friction member opposing relative movement of said friction member and wedge block; inwardly extending arms on said shoes, said arms having wedging engagement with the wedge block; and an additional spring within said friction member reacting between the latter and said arms for forcing the latter into wedging engagement with the wedge faces of the wedge block.

5. In a shock absorber, the combination with a friction member having longitudinally disposed exterior friction surfaces; of friction shoes movable lengthwise of said member and having friction surfaces on their inner sides slidingly engaging the friction surfaces of said member; retaining means, anchored to the shoes and friction member, limiting relative separation of said shoes and friction member; wedge means having shouldered engagement with the shoes for limiting outward movement of said wedge means, said wedge means and shoes having cooperating wedge faces; and spring resistance means within said friction member, said spring resistance means including an element yieldingly opposing relative movement of the wedge and friction member and an element reacting between said friction member and shoes for forcing the wedge faces of the latter against the wedge faces of the wedge means.

6. In a friction shock absorbing device, the combination with a friction member comprising spaced side sections connected by an end member, said side sections having longitudinally disposed exterior friction surfaces; a pair of friction shoes movable lengthwise of said friction member, said shoes having interior friction surfaces engaging the friction surfaces of said side sections; inward extensions on said shoes; a retaining element anchored to said friction member and having shouldered engagement with said extensions of the shoes to limit relative longitudinal separation of said shoes and friction member, said extensions of the shoes having wedge faces thereon; a wedge member having interior wedge faces engaging the wedge faces of the extensions of the shoes, said wedge member having shouldered engagement with the shoes to limit outward movement of said wedge member; spring means embraced between the side sections of said friction member and having its opposite ends bearing on the end member and said extensions of the shoes; and additional spring means embraced between the side sections of said friction members and having its opposite ends bearing respectively on said end member and said wedge member.

JAMES E. LINDEMAN.